March 23, 1965 E. A. BARBER ETAL 3,174,806
SWITCH FOR PNEUMATIC CONVEYORS
Filed Nov. 13, 1962 5 Sheets-Sheet 1

INVENTORS
EDGAR A. BARBER
BERNARD G. WITTE
BY
ATTORNEYS

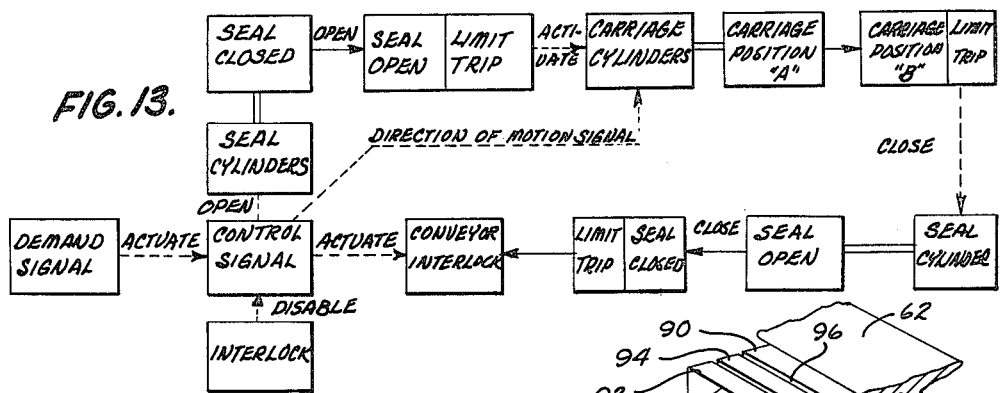
FIG. 13.
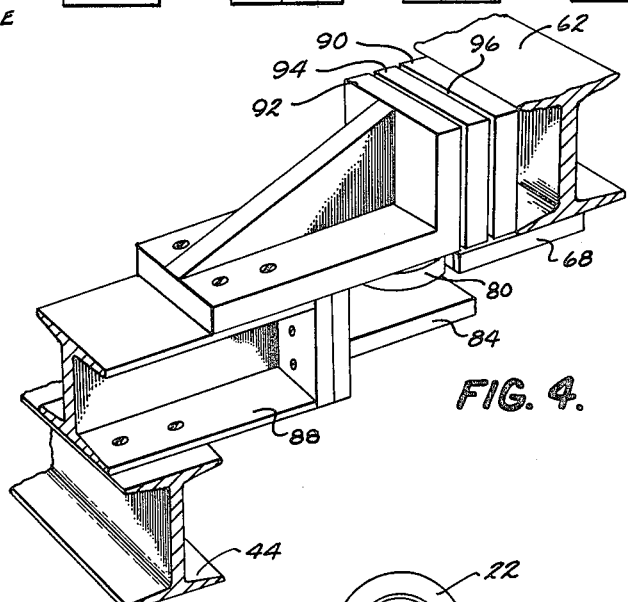
FIG. 4.
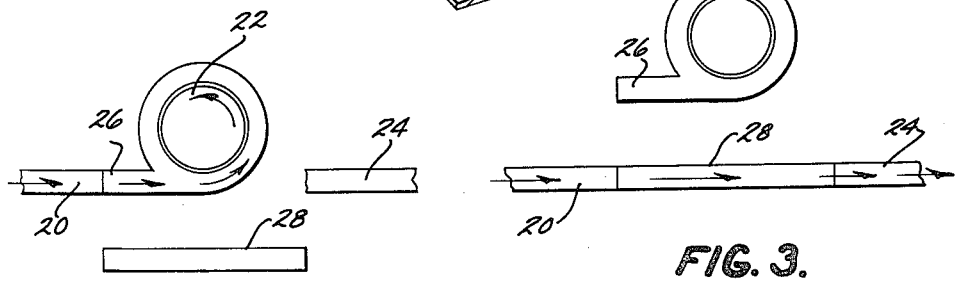
FIG. 2.
FIG. 3.

March 23, 1965 E. A. BARBER ETAL 3,174,806
SWITCH FOR PNEUMATIC CONVEYORS
Filed Nov. 13, 1962 5 Sheets-Sheet 4

INVENTORS
EDGAR A. BARBER
BERNARD G. WITTE
BY
ATTORNEYS

March 23, 1965 E. A. BARBER ETAL 3,174,806
SWITCH FOR PNEUMATIC CONVEYORS
Filed Nov. 13, 1962 5 Sheets-Sheet 5

INVENTORS
EDGAR A. BARBER
BERNARD G. WITTE
BY
*Price & Heneveld*
ATTORNEYS

United States Patent Office

3,174,806
Patented Mar. 23, 1965

3,174,806
SWITCH FOR PNEUMATIC CONVEYORS
Edgar A. Barber and Bernard G. Witte, Newaygo, Mich., assignors to Newaygo Engineering Company, Newaygo, Mich., a corporation of Michigan
Filed Nov. 13, 1962, Ser. No. 236,930
7 Claims. (Cl. 302—28)

This invention concerns switches for pneumatic conveying systems, and more particularly mechanical switches by means of which particulate material being pneumatically transported through pipes can be selectively switched between two discrete conveying paths.

The co-pending application Serial No. 58,550, filed September 26, 1960, now abandoned, entitled Conveying System for Particulate Materials assigned to the assignee of the present invention discloses a conveying system for particulate materials in which the materials are pneumatically transported from an originating station through a system of pipes to a receiving station. A transporting system of this nature depends a great deal for its efficiency on the existence of a spiraling air current pattern in the conveying pipe. This fact makes it necessary to provide a continuous, smooth cylindrical path throughout the extent of the conveying line, with no cross-sectional deformities and without any possibility of leakage of air. Furthermore, due to the abrasiveness of some materials such as foundry sand, it is imperative that at points where relative movement of parts exists, such as at switching elements, no sand be allowed to become infiltrated between two relatively movable parts. In installations such as that described in the aforesaid application, Serial No. 58,550, the seals used to seal the junction of conveying pipes at switch points must also be able to withstand pressure on the order of 100 pounds per square inch.

It is the primary object of this invention to provide a switching arrangement peculiarly adapted for use with a pneumatic conveying system such as that disclosed in the aforesaid application Serial No. 58,550.

It is another object of this invention to provide a switch for such systems which is capable of withstanding high pneumatic pressures, sudden shock loads resulting from the rapid conveying of heavy materials, and wear due to the abrasive action of the conveyed material itself.

These and other objects of this invention will become apparent from the following description, taken in connection with the accompanying drawings in which:

FIG. 2 is a diagrammatic view of the apparatus with the switch in one position;

FIG. 3 is a diagrammatic view of the apparatus with the switch in a second position;

FIG. 4 is a fragmentary, sectional, perspective view of the shock mounting mechanism of the switch;

FIG. 13 is a diagrammatic view of an electrical control system for the novel switch.

Basically, the invention uses a movable carriage carrying a pair of switching conduits which can be selectively connected to the inlet conduit or pipe so as to transport the materials arriving through the inlet pipe in either of a plurality of directions. Inasmuch as it is necessary to bridge the pipes with a movable sealing member at the point where they come together, and in view of the difficulty of providing a slidable, air-tight seal around the pipe, particularly in view of the abrasiveness of the material being transported, the invention provides a two-element seal whose elements are both independently slidable on the fixed section of the inlet pipe. The first section slides into sealing engagement with a sealing element fixed to the movable pipe section of the switch, but without forming an air-tight seal with the inlet pipe over which it slides. The second section then slides against the opposite end of the first section and expands a resilient sealing element into sealing relation with the inlet pipe after the first element has reached its sealing position.

In the following description, the invention is described both in connection with a switch whose one arm is a receiving drum and whose other arm is a bypass of the receiving station, and in connection with an embodiment in which one arm is, e.g. straight, and the other arm is curved.

Figure 1:
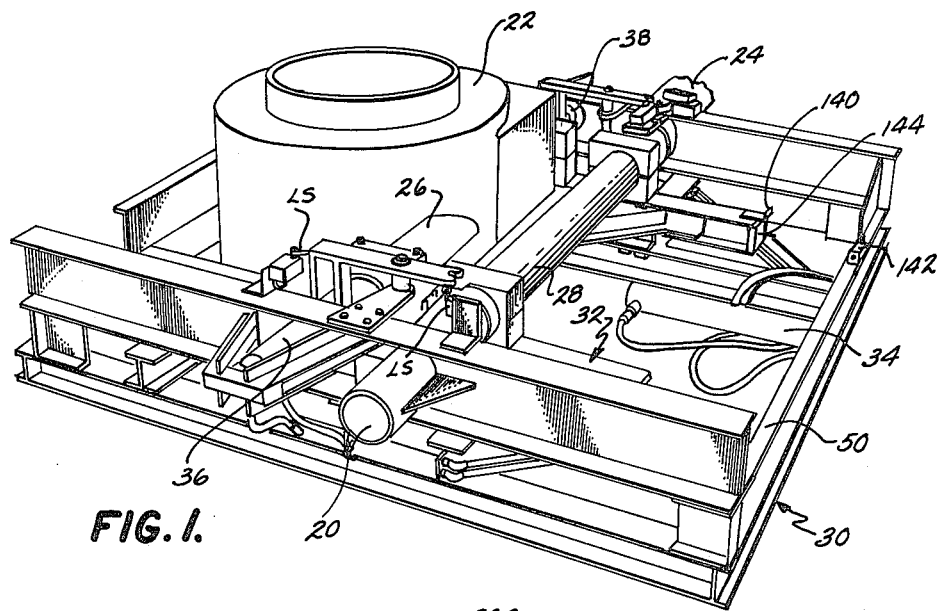
FIG. 1 is a perspective view of a transfer apparatus embodying the inventive switch.

Referring now to the drawings, FIG. 1 shows a first embodiment of the invention in which material, such as e.g. foundry sand, arriving through the inlet pipe 20 can be selectively routed either into a receiver 22 which discharges the sand downwardly, e.g. into a molding station, or into an outlet pipe 24 which may lead elsewhere in the system. The selective switching is accomplished in the device of FIG. 1 by either aligning the intake pipe 26 of the receiver 22 with the inlet pipe 20 (as shown diagrammatically in FIG. 2), or by aligning the transfer pipe 28 with the inlet pipe 20 and the outlet pipe 24 (as shown diagrammatically in FIG. 3). In the embodiment of FIG. 1, the inlet pipe 20 and the outlet pipe 24 are fixedly mounted to the stationary frame 30 of the switch, while receiver 22 and transfer pipe 28 are mounted on a carriage which is movable on frame 30 in a direction normal to the axis of inlet pipe 20. Transverse motion of carriage 32 is accomplished by a double-ended or reversible pneumatic cylinder 34. The junction between inlet pipe 20 and switching pipe 26 or 28 aligned with it in either extreme position of the carriage is accomplished by a mechanism described in more detail hereinafter and operated by a pneumatic cylinder 36. When transfer pipe 28 is aligned with inlet pipe 20 and outlet pipe 24, the junction between the outlet pipe 24 and the transfer pipe 28 is also sealed in an air tight manner by a similar mechanism actuated by a pneumatic cylinder 38.

Figure 7:
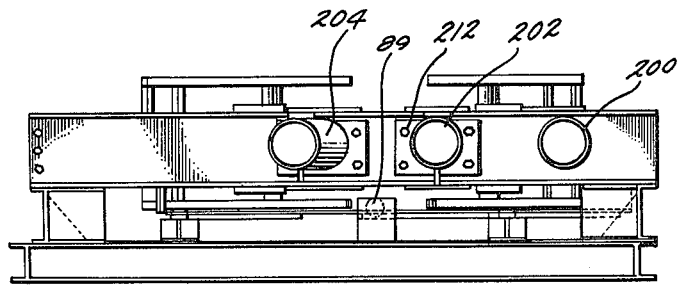
FIG. 7 is an end elevational view of the modified apparatus in FIG. 6.
Figure 8:
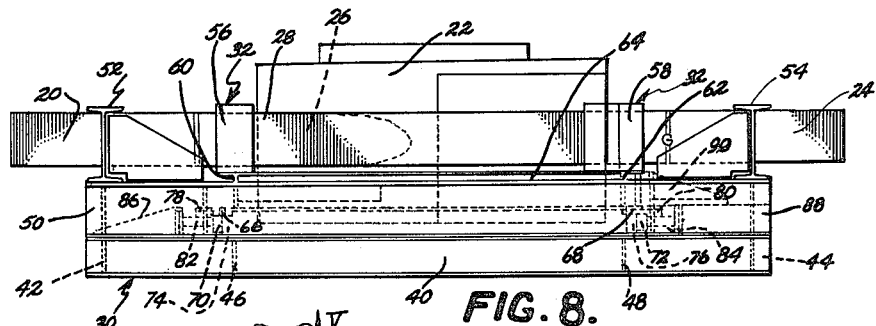
FIG. 8 is an end elevational view of the apparatus illustrated in FIG. 1.
Figure 9:
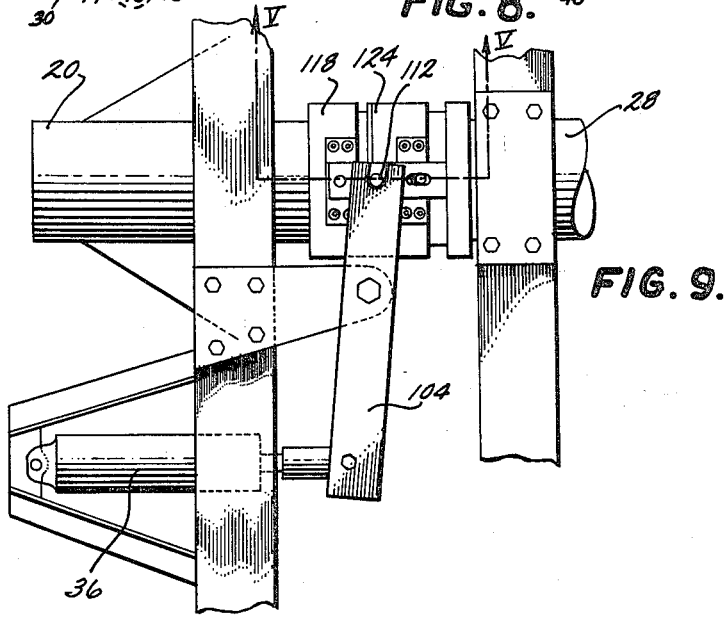
FIG 9 is a fragmentary view of one coupling seal and its actuating mechanism in the closed position.
Figure 11:
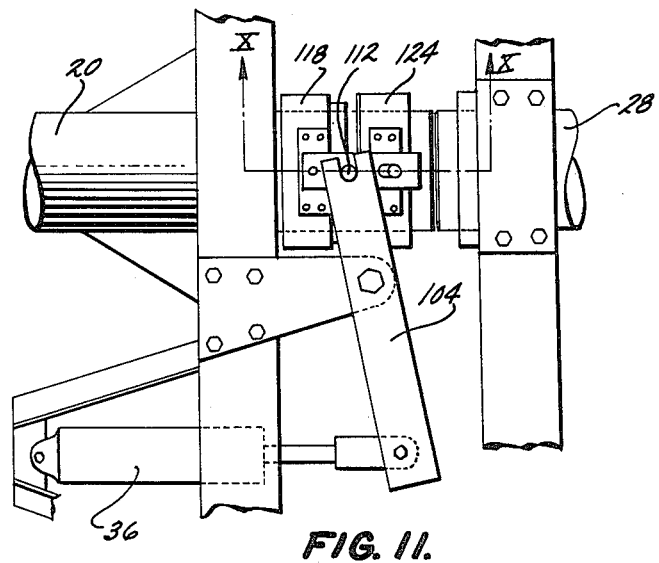
FIG. 11 is a fragmentary view of the apparatus in FIG. 9 when the coupling is open.

Turning now to FIGS. 4 and 8, it will be seen that FIG. 8 shows an end elevation of the device of FIG. 1, with the sealing mechanism and carriage moving mechanism removed. It will be seen that frame 30 consists of a pair of axial I-beams 40 located one behind the other in FIG. 8 which are connected together by transverse outer beams 42, 44 and inner beams 46, 48. Overlying the axial beams 40 is a pair of upper axial beams 50 which support the transverse frame members 52, 54. The carriage 32 consists of a pair of supporting blocks 56, 58 for transfer pipe 28 which rest on a pair of transverse carriage beams 60, 62. The transverse carriage beams 60, 62 are joined together by a pair of axial carriage beams 64. The transverse carriage beams 60, 62 carry on their underside a pair of guide plates 66, 68 which are vertically supported by rollers 70, 72 mounted on roller brackets 74, 76 attached to the inner transverse frame beams 46, 48. The guide plates 66, 68 are laterally guided by rollers 78, 80 supported on horizontal roller brackets 82, 84 bolted to short roller supporting beams 86, 88 which in turn rest on the outer transverse frame beams 42, 44 (FIG. 4). Vertical movement of the carriage 32 is prevented by hold-down rollers as shown by rollers 89 in FIG. 7.

Both sides of the frame in FIG. 8 are provided with a shock absorbing device, one of which is more clearly shown in FIG. 4. This device is intended to absorb the impact of conveyed material onto the receiver wall, which can be quite violent and may in the long run result in deformation or flattening of the horizontal rollers 80 if it were not for the shock absorbing means of FIG. 4. The shock absorbing device consists of a bumper plate 90 welded to the transverse carriage beam 62. When the carriage 32 moves into the position in which the receiver intake pipe 26 is aligned with the inlet pipe 20, the bumper plate 90 moves into very close juxtaposition to the shock absorbing bracket 92 bolted to the roller supporting bracket 88. An adjustable shim 94 may be provided between the shock absorbing bracket 92 and the bumper plate 90 to reduce the clearance space 96 between the bumper plate 90 and the shim 94 to the minimum possible for satisfactory operation of the apparatus. If the transverse ends of the bumper plate 90 or of the bracket 92 are tapered, it is of course possible to dimension the above-mentioned parts in such a manner that the bumper plate 90 and the shim 94 actually touch. It will be seen that with the arrangement as described above, any impact load resulting from the impact of conveyed material against the receiver walls will be transmitted through the bumper plate to the shock absorbing bracket and will not damage the horizontal roller 80.

Sealing mechanism

In the following description of the sealing mechanism which provides an air tight seal between the inlet or outlet pipe and the switching pipe aligned with it, it will be understood that the device shown in FIGS. 5, 9, 11 and 12 is equally applicable to the receiver-transfer embodiment of FIGS. 1 and 8, and to the double transfer embodiment shown in FIGS. 6 and 7.

Figure 12:
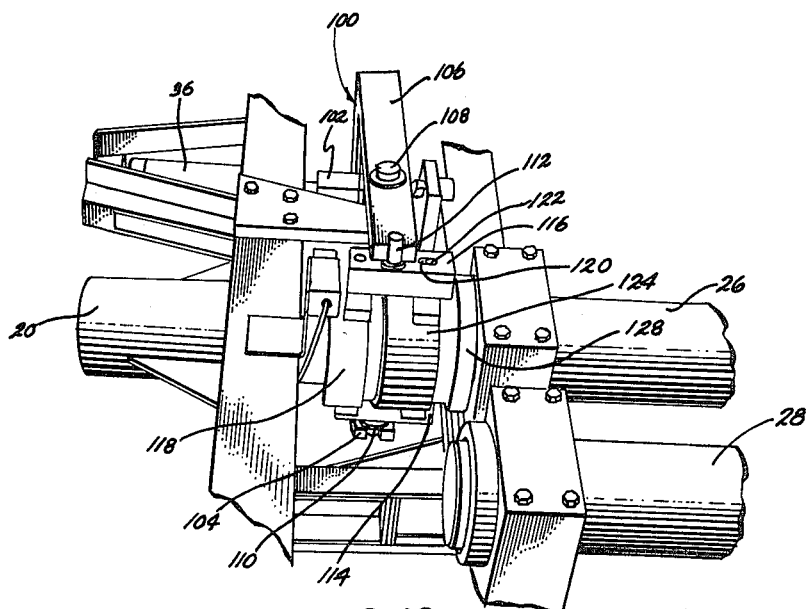
FIG. 12 is a perspective enlarged view of the apparatus with the coupling actuator.

As will be best seen from FIG. 12, the sealing mechanism of this invention is driven by a pneumatic cylinder 36 whose piston reciprocates the yoke 100 through a linkage 102. The yoke 100 comprises a lower arm 104 and an upper arm 106 rigidly connected at their upper ends in FIG. 12. The yoke 100 is pivotable about a pivot shaft 108 by reciprocation of the linkage 102. The lower ends (in FIG. 12) of the arms 104, 106 are slotted to form forks which engage the operating pins 110, 112 of the sealing mechanism so as to reciprocate them in a direction longitudinal with respect to the inlet pipe 20. The operating pins 110, 112 are rigidly connected to operating blocks 114, 116 which in turn are fixedly connected to the outer collar 118 of the sealing mechanism. The operating blocks 114, 116 each have a slot 120 which receives the control pin 122 of the inner collar 124. Collar 124 is biased away from collar 118 by springs 126 (FIG. 5) located inside of the operating block 116. Collar 124 and the fixed collar 128 on the transfer pipe 28 each embrace a resilient ring 130, 132 respectively which cooperate with shoulders 134, 136 respectively of collars 118 and 124 to form a seal in a manner described hereinbelow.

Operation

In either embodiment of the invention, the functioning of the device is essentially the same. Let it be assumed, for example, that the device of FIG. 1 is in the position shown in FIG. 1 in which conveyed materials entering the switch from pipe 20 is conveyed through the transfer pipe 28 and out the outlet pipe 24. If it is now desired to switch the device so that instead of being transferred into transfer pipe 28, the conveyed material enters pipe 26 and receiver 22, an appropriate demand signal is established in some way, as e.g. by throwing a switch.

Referring to the sequence diagram of FIG. 13, it will be seen that this demand signal actuates a control signal generator, e.g. a relay. This will occur providing that the control signal generator is not disabled from responding to the demand signal by an interlock signal which, for example, may consist of breaking the circuit of the control signal generator while a batch of materials is being conveyed through the system.

Response of the control signal generator to the demand signal (i.e. closing of the control signal relay) results in three things: firstly, the electric valve controlling the seal cylinders 36, 38 is actuated to cause the seal cylinders to open the seals; secondly, the electric valves (not shown) are set to move the carriage cylinder from left to right in FIG. 1 when the carriage is released; and thirdly, an interlock circuit is actuated in the conveying system so that no material can be conveyed through pipe 20 while the switch is in the process of moving from one position to the other. The seal cylinders 36, 38 now open the seals associated therewith in a manner hereinafter described. When the seals reach their open position, the yokes 100 trip limit switches and thereby release the carriage. The carriage cylinders 34 now move the carriage to the right in FIG. 1 until the bracket 140 hits the limit switch 142 just as the pipe 26 becomes aligned with the inlet pipe 20. In accordance with the invention, pneumatic power is not removed from the cylinder 34 when the carriage reaches its extreme rightmost position, because in order to maintain stress-free alignment between pipe 26 and pipe 20, the plate 144 butts against frame member 50 at the end of the rightward travel of the carriage and is held in this position by the pneumatic pressure on cylinder 34.

The tripping of limit switch 142 actuates the electric valves which supply compressed air to the seal cylinders 36, 38 and causes the seal cylinders to be actuated in such a direction as to close the seals. When the seals reach their closed position, the yokes 100 actuate a limit switch which releases the conveyor disabling interlock and permits material to once again be conveyed through the inlet pipe 20.

As the carriage moved into its righthand position in FIG. 1, the bumper plate 90 on the carriage came into position alongside the shim 94 of the shock absorber bracket 92 (FIG. 4). Consequently, in the righthand position of the carriage 32, when the conveyed material goes into the receiver 22, any axial stress resulting from the diversion of the conveyed material from an axial path in the diverter 22 is absorbed by the shock absorber bracket 92 and cannot affect adversely the guide rollers 80.

The operation of the sealing mechanism is as follows: having reference to FIGS. 9 and 5, and 11 and 10, respectively, it will be seen that when the seal is closed, the piston of cylinder 36 is completely retracted into cylinder 36. In this position, as will be best seen from FIG. 5, the arm 104 of the yoke 100 is in such a position that its slotted end is as far to the right in FIG. 5 as it will go. In this condition, the force applied to the arm 104 by the pneumatic cylinder 36, which is always under pressure when the seal is in the closed position, is applied to the operating pin 112 and through the operating block 116 to the control pin 146 of the outer collar 118. In this position, the shoulder 134 of collar 118 pushes against the resilient ring 130 embraced by collar 124 and deforms it into firm contact with the inlet pipe 20. The force applied to control pin 146 by the operating block 116 is transmitted to collar 124 partly through the resilient ring 130, and partly through spring 126. These two forces are combined in acting upon the collar 124 and cause the shoulder 136 of collar 124 to engage the sealing ring 132 embraced by the fixed collar 128 with sufficient force to prevent any escape of air or conveyed material in spite of the fact that the area of contact between shoulder 136 and ring 132 is smaller than the area of contact between ring 130 and pipe 20.

Figure 10:
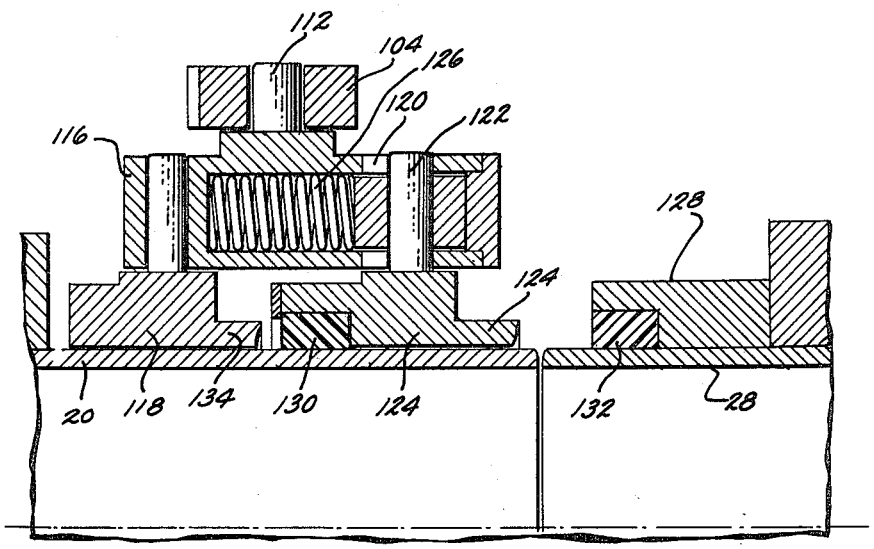
FIG. 10 is a fragmentary sectional view taken on plane X—X of FIG. 11.

If the seal is now opened, cylinder 36 moves arm 104 to the left in FIG. 10, and arm 104 takes collar 118 directly with it through the intermediary of operating pin 112, operating block 116, and control pin 146. The first effect of this leftward movement of collar 118 is to permit the spring 126 to expand and to push the control pin 122 of collar 124 to the right in the slot 120 of operating block 116 as far as it will go. The resultant separation of collars 118 and 124 permits the resilient ring 130 to return to its natural shape in which it clears the pipe 20 for sliding movement with respect thereto. As the arm 104 and the block 116 continue to move to the left in FIG. 10, the end of slot 120 eventually carries the control pin 122 of collar 124 with it and pulls the collar 124 out of engagement with the sealing ring 132. When the arm 104 has reached its extreme position shown in FIG. 10, it will be readily seen that the two sliding collars 118, 124 are entirely on pipe 20 and leave the pipe 28 free for transverse movement.

The same phenomena occur in reverse during the closing process of the seal.

Modification

Figure 6:
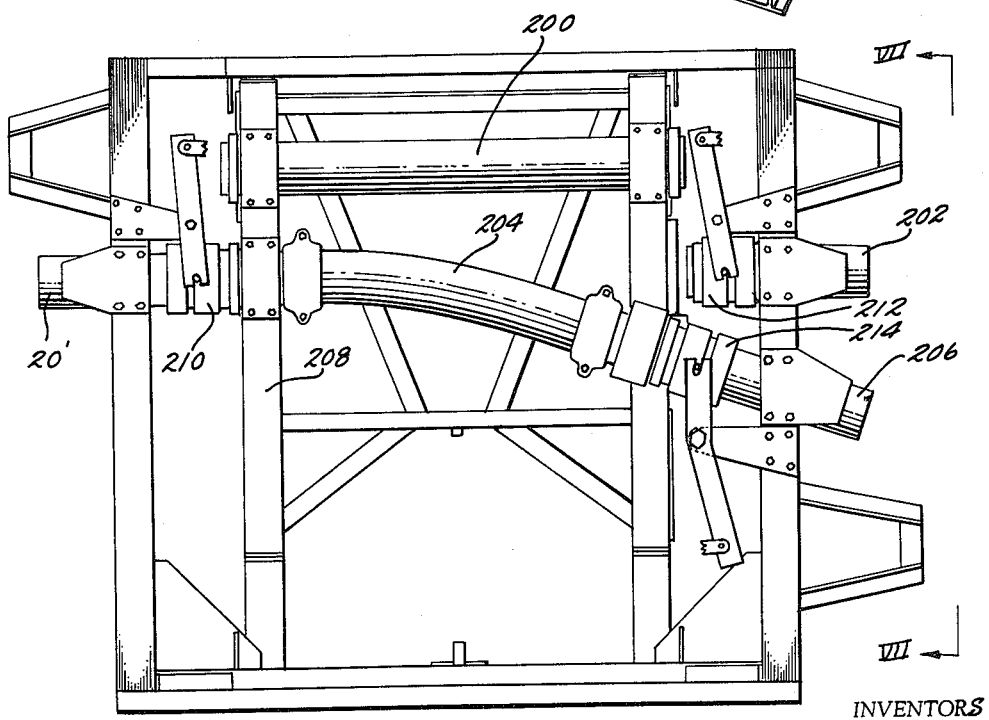
FIG. 6 is a plan view of a modified transfer apparatus.
Figure 5:
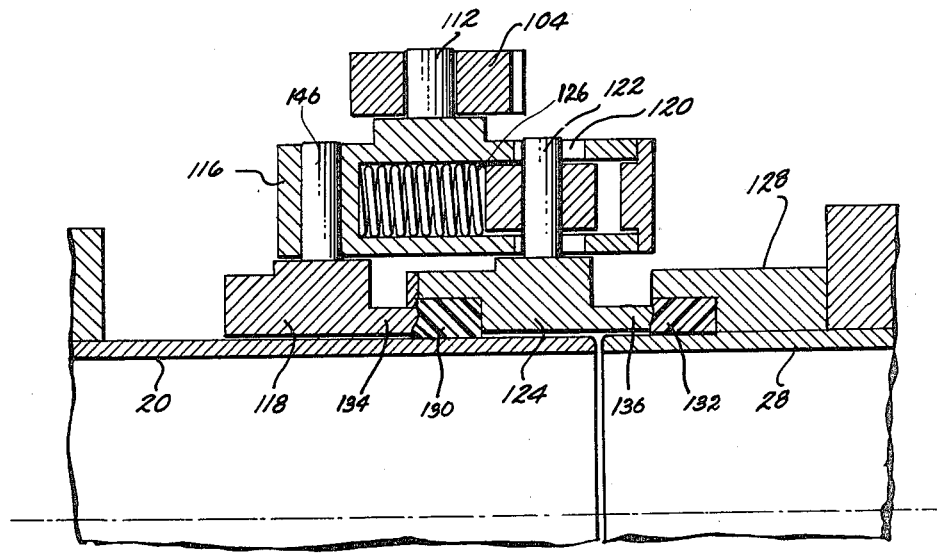
FIG. 5 is a fragmentary, sectional view of the seal coupling taken on plane V—V of FIG. 9.

Instead of the apparatus shown in FIGS. 1 through 3, the control mechanism and seal mechanism shown and described may be used in combination with the double tube apparatus shown in FIGS. 6 and 7. Here the inlet tube 20' can cooperate with straight tube segment 200 to transfer sand to outlet tube 202, or with curved tube segment 204' to transfer sand to outlet tube 206. The tube segments are mounted on a reciprocal carriage 208 for movement as in the first embodiment. Each of the seal connectors 210, 212, and 214 for the ends of the tubes 20', 202, and 206 respectively are controlled by pivotal arms 216, 218, and 220 actuated by suitable air cylinders (not shown). The basic operation of the modification is the same as that described with respect to the first illustrated structure.

Obviously, the present invention is capable of being carried out in numerous different embodiments according to the particular requirements of a given situation. Consequently, the present invention is not to be limited to the embodiments shown in the drawings and described in the specification, but only by the scope of the following claims.

We claim:

1. A switch for pneumatic conveyors, comprising: a frame; an inlet conduit fixed to said frame; a plurality of switching conduits movable with respect to said frame into selective alignment with said inlet conduit; means for moving said switching conduits; and sealing means surrounding said conduits for establishing a pressure-tight connection between said inlet conduit and a switching conduit aligned therewith; said sealing means including a first sealing element on one of said aligned conduits, and a pair of second sealing elements independently axially movable on the other of said aligned conduits, one of said pair of second sealing elements being engageable with said first sealing element to seal the junction of said aligned conduits against radial escape of material conveyed through said aligned conduits, and said second sealing elements being engageable with one another to seal said junction against axial escape of conveyed material along said other conduit.

2. A sealing mechanism for releasably joining a pair of aligned conduits in pressure-tight relation, comprising: a first sealing element on one of said aligned conduits; a pair of second sealing elements independently axially movable on the other of said aligned conduits; one of said pair of second sealing elements being engageable with said first sealing element to seal the junction of said aligned conduits against radial escape of material conveyed through said aligned conduits; and said second sealing elements being engageable with one another to seal said junction against axial escape of conveyed material along said other conduit.

3. A sealing mechanism for releasably joining a pair of aligned conduits in pressure-tight relation, comprising: a stationary sealing element on one of said aligned conduits; a pair of movable sealing sleeves independently axially movable on the other of said aligned conduits; means for moving one of said pair of movable sealing sleeves into engagement with said stationary sealing element to seal the junction of said aligned conduits against radial escape of material conveyed through said aligned conduits; and said movable sealing sleeves into engagement with one another to seal said junction against axial escape of conveyed material along said other conduit.

4. A sealing mechanism for releasably joining a pair of aligned conduits in pressure-tight relation, comprising: a first collar fixedly mounted on one of said conduits; a second collar axially slidably mounted on the other of said conduits; a third collar also axially slidably mounted on said other conduit; a first resilient ring interposed between said first and second collar; a second resilient ring interposed between said second and third collars; said first and second collars cooperating with said first ring when engaged therewith to form a seal against radial escapement of pressurized fluid between said first and second collars, and said second and third collars cooperating with said second ring and said other conduit when engaged therewith to form a seal against axial escapement of pressurized fluid along said other conduit; and means for slidingly engaging said collars with said rings.

5. The device of claim 4, in which said means for slidingly engaging said collars with said rings are operatively connected to said third collar; and further comprising a lost motion connection between said second and third collars, said lost motion connection being so arranged that sealing force is transmitted from said third collar to said first collar through said second collar and said rings, but said second collar is pulled away from said first collar by said lost motion connection when said seal is opened.

6. The device of claim 5, further comprising means for resiliently biasing said second collar away from said third collar to the extent permitted by said lost motion connection.

7. A switch for pneumatic conveyors, comprising: a frame; an inlet conduit fixed to said frame; a carriage movable on said frame transversely to said inlet conduit; a pair of switching conduits mounted on said carriage for movement into selective alignment with said inlet conduit; means for moving said carriage; sealing means surrounding said conduits and movable into and out of a sealing position in which they establish a pressure-tight connection between said inlet conduit and a switching conduit aligned therewith; means for moving said sealing means into and out of said position; abutment means on said frame at each end of the carriage's travel for stopping said carriage in positions of exact alignment of said aligned conduits, said carriage moving means being arranged to continuously bias said carriage against said stop to prevent said sealing means from being subjected to radial stress; bracing means engaged by said carriage when it is in a position where said diverting switch conduit is aligned with said inlet conduit to absorb axial loads imposed on said carriage by the transverse diversion of said conveyed material; said sealing means including a first collar fixedly mounted on one of said conduits; a second collar axially slidably mounted on the other of said conduits; a third collar also axially slidably mounted on said other conduits; a first resilient ring interposed between said first and second collar; a second resilient ring interposed between second and third collars; said first and second collars cooperating with said first ring when engaged therewith to form a seal against radial escapement of pressurized fluid between said first and second collars, and said second and third collars cooperating with said second ring and said other conduit when engaged therewith to form a seal against axial escapement of pressurized fluid along said other conduit; and means for slidingly engaging said collars with said rings, said last-named means including a pneumatic cylinder operatively connected to said third collar, a lost motion connection between said second and third collars, said lost motion connection being so arranged that sealing force is transmitted from said third collar to said first collar through said second collar and said rings, but said second collar is pulled away from said first collar by said lost motion connection when said seal is opened, and a spring resiliently biasing said second collar away from said third collar to the extent permitted by said lost motion connection.

References Cited in the file of this patent

UNITED STATES PATENTS

| | | |
|---|---|---|
| 2,581,853 | Glaza | Jan. 8, 1952 |
| 2,639,196 | Glaza | May 19, 1953 |
| 2,735,724 | Kauffman | Feb. 21, 1956 |